United States Patent
Pain et al.

(10) Patent No.: US 12,257,784 B2
(45) Date of Patent: *Mar. 25, 2025

(54) SYSTEMS FOR UPDATING TARGET MAPS INCLUDING CONSIDERATIONS OF ROTATIONAL POSITION IN ELECTROCHEMICAL-ADDITIVE MANUFACTURING SYSTEMS

(71) Applicant: Fabric8Labs, Inc., San Diego, CA (US)

(72) Inventors: David Pain, San Diego, CA (US); Kareemullah Shaik, San Diego, CA (US); Joshua Gillespie, Poway, CA (US); Jeffrey Herman, San Diego, CA (US)

(73) Assignee: Fabric8Labs, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,327

(22) Filed: Feb. 29, 2024

(65) Prior Publication Data

US 2024/0246299 A1    Jul. 25, 2024

Related U.S. Application Data

(63) Continuation of application No. 18/338,113, filed on Jun. 20, 2023, now Pat. No. 11,945,170, which is a
(Continued)

(51) Int. Cl.
*B29C 64/393* (2017.01)
*B29C 64/264* (2017.01)
(Continued)

(52) U.S. Cl.
CPC ........ *B29C 64/393* (2017.08); *B29C 64/264* (2017.08); *C25D 1/003* (2013.01);
(Continued)

(58) Field of Classification Search
None
See application file for complete search history.

(56) References Cited

U.S. PATENT DOCUMENTS

| | | | |
|---|---|---|---|
| 4,575,330 | A | 3/1986 | Hull |
| 4,678,282 | A | 7/1987 | Yaniv et al. |

(Continued)

FOREIGN PATENT DOCUMENTS

| | | | |
|---|---|---|---|
| CN | 204097583 U | 1/2015 | |
| CN | 104593830 A | 5/2015 | |

(Continued)

OTHER PUBLICATIONS

U.S. Appl. No. 18/064,686, Non Final Office Action mailed Mar. 31, 2023, 11 pgs.

(Continued)

*Primary Examiner* — Louis J Rufo
(74) *Attorney, Agent, or Firm* — Polygon IP, LLP

(57) ABSTRACT

Described herein are electrochemical-additive manufacturing methods and systems using such methods. A method comprises depositing a material onto a deposition electrode by flowing a current between that deposition electrode and each of multiple individually-addressable electrodes, forming an electrode array. These currents are independently controlled based on a target map and using deposition control circuits, each coupled to one individually-addressable electrode. The target map is generated by a system controller based on various characteristics of the system (e.g., the performance of each deposition control circuit and/or individually-addressable electrode, electrolyte composition) and the desired characteristics of the deposited material (e.g., deposition location, uniformity, morphology). Furthermore, when the deposition electrode and the electrode array move relative to each other, the system controller dynamically updates the target map based on their relative (Continued)

positions. This movement can provide a fresh electrolyte between the electrodes and enable deposition at new locations.

20 Claims, 10 Drawing Sheets

Related U.S. Application Data continuation of application No. 18/064,686, filed on Dec. 12, 2022, now Pat. No. 11,745,432.

(60) Provisional application No. 63/288,943, filed on Dec. 13, 2021.

(51) Int. Cl.
*B33Y 10/00* (2015.01)
*B33Y 30/00* (2015.01)
*B33Y 50/02* (2015.01)
*C25D 1/00* (2006.01)
*C25D 17/10* (2006.01)
*C25D 21/12* (2006.01)

(52) U.S. Cl.
CPC ............. *C25D 17/10* (2013.01); *C25D 21/12* (2013.01); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 5,132,820 | A | 7/1992 | Someya et al. |
| 5,403,460 | A | 4/1995 | Sala et al. |
| 5,641,391 | A | 6/1997 | Hunter et al. |
| 5,998,805 | A | 12/1999 | Shi et al. |
| 6,036,834 | A | 3/2000 | Clerc |
| 7,839,831 | B2 | 11/2010 | Vrcelj et al. |
| 8,168,540 | B1 | 5/2012 | Reid et al. |
| 8,681,077 | B2 | 3/2014 | Kimura |
| 9,777,385 | B2 | 10/2017 | Wirth et al. |
| 10,465,307 | B2 | 11/2019 | Pain et al. |
| 10,724,146 | B1 | 7/2020 | Pain et al. |
| 10,914,000 | B1 | 2/2021 | Pain et al. |
| 10,947,632 | B1 | 3/2021 | Pain et al. |
| 11,232,956 | B2 | 1/2022 | Pain et al. |
| 11,313,035 | B2 | 4/2022 | Pain et al. |
| 11,313,036 | B2 | 4/2022 | Pain et al. |
| 11,401,603 | B2 | 8/2022 | Pain et al. |
| 11,745,432 | B2 * | 9/2023 | Pain ..................... B29C 64/264 205/122 |
| 11,945,170 | B2 * | 4/2024 | Pain ......................... C25D 1/00 |
| 2001/0014409 | A1 | 8/2001 | Cohen |
| 2003/0006133 | A1 | 1/2003 | Metzger |
| 2004/0129573 | A1 | 7/2004 | Cohen |
| 2005/0045252 | A1 | 3/2005 | Yamasaki et al. |
| 2005/0176238 | A1 | 8/2005 | Cohen et al. |
| 2005/0183959 | A1 | 8/2005 | Wilson et al. |
| 2005/0202660 | A1 | 9/2005 | Cohen et al. |
| 2005/0223543 | A1 | 10/2005 | Cohen et al. |
| 2006/0283539 | A1 | 12/2006 | Slafer |
| 2007/0068819 | A1 | 3/2007 | Singh et al. |
| 2007/0089993 | A1 | 4/2007 | Schwartz et al. |
| 2007/0221504 | A1 | 9/2007 | Luo |
| 2010/0300886 | A1 | 12/2010 | Lin et al. |
| 2011/0210005 | A1 | 9/2011 | Bossche et al. |
| 2017/0145584 | A1 * | 5/2017 | Wirth ....................... C25D 3/24 |
| 2019/0160594 | A1 | 5/2019 | Flamm et al. |
| 2021/0047744 | A1 | 2/2021 | Biton |
| 2023/0182398 | A1 | 6/2023 | Pain |
| 2023/0330940 | A1 | 10/2023 | Pain et al. |

FOREIGN PATENT DOCUMENTS

| | | |
|---|---|---|
| CN | 104178782 A | 12/2016 |
| WO | 2017087884 A1 | 5/2017 |
| WO | 2019150362 A1 | 8/2019 |
| WO | 2021041265 A1 | 3/2021 |

OTHER PUBLICATIONS

U.S. Appl. No. 18/064,686, Notice of Allowance mailed Jun. 7, 2023, 7 pgs.
U.S. Appl. No. 18/338,113, Non Final Office Action mailed Jan. 3, 2024, 14 pgs.
U.S. Appl. No. 18/338,113, Notice of Allowance mailed Feb. 23, 2024, 10 pgs.
Frey et al., "Switch-matrix-based High-Density Microelectrode Array in CMOS Technology", IEEE Journal of Solid-State-Circuits, Feb. 2010, pp. 467-482, vol. 45, No. 2.
International Search Report and Written Opinion for PCT/US2020/04753I dated Sep. 29, 2020.
Nakamura et al., Incorporation of input function into displays using LTPS TFT technology, Journal of the SID, 2006, pp. 363-369, 14/4.
Stewart et al., "Polysilicon TFT Technology for Active Matrix OLEO Displays", IEEE Transactions on Electron Devices, May 2001, pp. 845-851, vol. 48, No. 5.
Supplementary International Search Report for PCT/US2020/047531 dated Nov. 22, 2021.
U.S. Appl. No. 17/535,437, filed Nov. 24, 2021.
U.S. Appl. No. 17/566,546, filed Dec. 30, 2021.

* cited by examiner

| Current map 220 / Individual target currents 224 [mA] |||||| 
|---|---|---|---|---|---|
| | Column |||||
| Row | 1 | 2 | 2 | 4 | 5 |
| 1 | $X_{11}$ | $X_{12}$ | $X_{13}$ | $X_{14}$ | $X_{15}$ |
| 2 | $X_{21}$ | $X_{22}$ | $X_{23}$ | $X_{24}$ | $X_{25}$ |
| 3 | $X_{31}$ | $X_{32}$ | $X_{33}$ | $X_{34}$ | $X_{35}$ |
| 4 | $X_{41}$ | $X_{42}$ | $X_{43}$ | $X_{44}$ | $X_{45}$ |
| 5 | $X_{51}$ | $X_{52}$ | $X_{53}$ | $X_{54}$ | $X_{55}$ |

*FIG. 3B*

SYSTEMS FOR UPDATING TARGET MAPS INCLUDING CONSIDERATIONS OF ROTATIONAL POSITION IN ELECTROCHEMICAL-ADDITIVE MANUFACTURING SYSTEMS

CROSS-REFERENCE TO RELATED APPLICATIONS

This application is a continuation of U.S. patent application Ser. No. 18/338,113, filed on 2023 Jun. 20, which is a continuation of U.S. patent application Ser. No. 18/064,686, filed on 2022 Dec. 12 and granted as U.S. Pat. No. 11,745,432 on 2023 Sep. 5, which claims the benefit under 35 U.S.C. § 119(e) of U.S. Provisional Patent Application No. 63/288,943, filed on 2021 Dec. 13, both of which are incorporated herein by reference in their entirety for all purposes.

BACKGROUND

Additive manufacturing, also known as 3-dimensional (3D) printing, is often used for the production of complex parts using a layer-by-layer deposition process on substrates. Additive manufacturing can utilize a variety of processes in which various materials (e.g., plastics, liquids, and/or powders) are deposited, joined, and/or solidified. Some examples of techniques used for additive manufacturing include vat photopolymerization, material jetting, binder jetting, powder bed fusion (e.g., using selective laser melting or electron beam melting), material extrusion, directed energy deposition, and sheet lamination. Metal additive manufacturing has been limited due to the high cost associated with selective laser melting and electron beam melting systems. Further, thermally fusing produces parts with rough surface finishes because the unmelted metal powder is often sintered to the outer edges of the finished product.

SUMMARY

Described herein are electrochemical-additive manufacturing methods and systems using such methods. A method comprises depositing a material onto a deposition electrode by flowing a current between that deposition electrode and each of multiple individually-addressable electrodes, forming an electrode array. These currents are independently controlled based on a target map and using deposition control circuits, each coupled to one individually-addressable electrode. The target map is generated by a system controller based on various characteristics of the system (e.g., the performance of each deposition control circuit and/or individually-addressable electrode, electrolyte composition) and the desired characteristics of the deposited material (e.g., deposition location, uniformity, morphology). Furthermore, when the deposition electrode and the electrode array move relative to each other, the system controller dynamically updates the target map based on their relative positions. This movement can provide a fresh electrolyte between the electrodes and enable deposition at new locations.

In some examples, an electrochemical-additive manufacturing method comprises providing an electrochemical additive manufacturing system comprising a system controller, a deposition power supply, deposition control circuits, an electrode array, a deposition electrode, and an electrolyte solution. The deposition control circuits are communicatively coupled to the system controller and electrically coupled to the deposition power supply. The electrode array comprises individually-addressable electrodes, each electrically coupled to one of the deposition control circuits. The system controller comprises a target map comprising individual target currents, one for each of the individually-addressable electrodes. The method also comprises depositing a material onto the deposition electrode from the electrolyte solution by flowing a current between each of the individually-addressable electrodes and the deposition electrode. The current is independently controlled by each of the deposition control circuits based on a corresponding one of the individual target currents in the target map. The electrode array and the deposition electrode move relative to each other while the system controller dynamically updates the target map based on the relative position of the electrode array and the deposition electrode.

In some examples, the electrode array moves relative to the deposition electrode in a direction substantially parallel to a plane of the individually-addressable electrodes. In more specific examples, the electrode array is linearly translated relative to the deposition electrode. In the same or other examples, the electrode array is rotated relative to the deposition electrode. Alternatively, the electrode array moves relative to the deposition electrode in a direction substantially perpendicular to a plane of the individually-addressable electrodes.

In some examples, the electrode array moves relative to the deposition electrode while the material is being deposited onto the deposition electrode from the electrolyte solution. In the same or other examples, the electrode array moves relative to the deposition electrode using an electrode-position actuator controlled by the system controller, in response to sensor input received by the system controller. For example, the sensor input represents at least one of (a) bubbling in the electrolyte solution provided at least between the electrode array and the deposition electrode, and (b) composition variations in the electrolyte solution provided at least between the electrode array and the deposition electrode. In some examples, the system controller further receives positioning-sensor input from one or more position sensors and uses the positioning-sensor input to dynamically update the target map. In the same or other examples, the sensor input is received by the system controller from each of the deposition control circuits. For example, the sensor input corresponds to one or both of a voltage value and a current value, sensed by each of the deposition control circuits.

In some examples, the target map is dynamically updated based on one or both of the voltage value and the current value, sensed by each of the deposition control circuits. In the same or other examples, the target map is dynamically updated based on desired variations in the material in addition to the relative position of the electrode array and the deposition electrode. In some examples, the target map comprises instructions for at least two of the deposition control circuits to simultaneously pass different levels of the electrical current through at least two of the individually-addressable electrodes.

In some examples, a subset of the individually-addressable electrodes has no current passing. The subset is distributed among the individually-addressable electrodes according to one of a Bayer matrix, a dispersed dot halftoning, a clustered-dot matrix, or a Jarvis error diffusion. In the same or other examples, the individual target currents are selected based on a charge density associated with each of the individually-addressable electrodes.

In some examples, the method further comprises generating operating parameters for each of the deposition control circuits based on the target map. The operating parameters are generated using the system controller based on a calibration map associated with at least one of the on-resistance of each of the deposition control circuits or ohmic losses associated between the deposition power supply and each of the deposition control circuits.

In some examples, the target map is generated based on at least one of desired deposition rates, grain sizes with the material, grain orientations within the material, compositions of the material, brightness values of the material, and densities of the material.

In some examples, the target map is generated based on one or more of the temperature of the electrolyte solution, the conductivity of the electrolyte solution, the flow rate of the electrolyte solution, the composition of the electrolyte solution, and the distance between the material and the individually-addressable electrodes.

In some examples, an electrochemical additive manufacturing system comprises a deposition power supply, deposition control circuits, coupled to the deposition power supply, and an electrode array, comprising individually-addressable electrodes, each electrically coupled to one of the deposition control circuits. The electrochemical additive manufacturing system also comprises a deposition electrode, electrically coupled to the deposition power supply. An electrode-position actuator configured to move the electrode array and the deposition electrode relative to each other, and a system controller, which is communicatively coupled to the electrode-position actuator and to each of the deposition control circuits and comprising a target map comprising individual target currents, one for each of the individually-addressable electrodes. The deposition control circuits are configured to control electric current through each of the individually-addressable electrodes based on a corresponding one of the individual target currents in the target map. The system controller is configured to dynamically update the target map based on the relative position of the electrode array and the deposition electrode while the electrode-position actuator moves.

BRIEF DESCRIPTION OF THE DRAWINGS

FIG. 3B is a schematic illustration of a current map comprising individual current targets, in accordance with some examples.

DETAILED DESCRIPTION

Figure 1A:
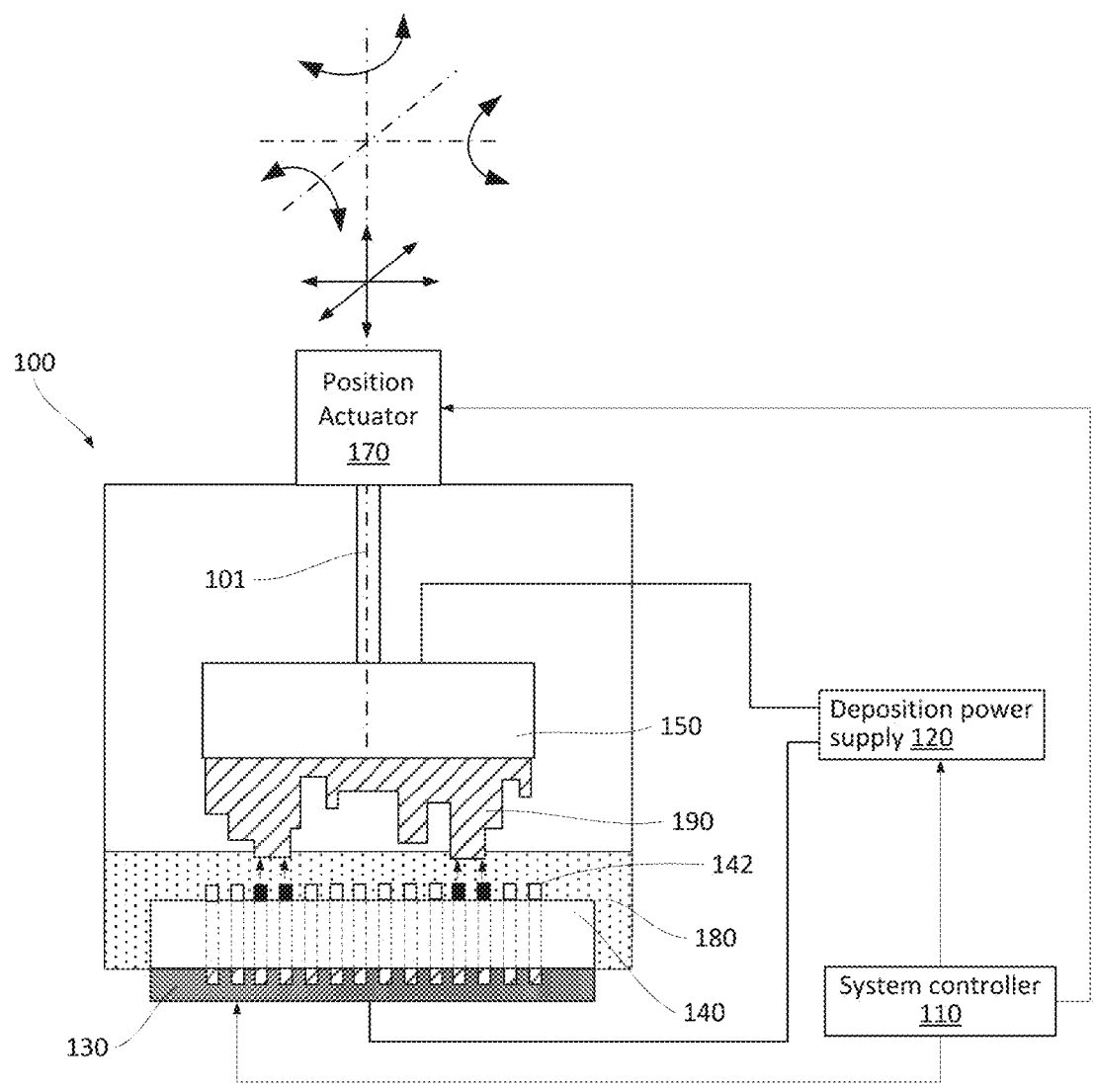
FIG. 1A is a schematic illustration of an electrochemical-additive manufacturing system, showing relative positions and connections between various components of the system, in accordance with some examples.

In the following description, numerous specific details are outlined to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Various shortcomings of conventional additive manufacturing of metals (e.g., laser melting and electron beam melting) have been addressed with electrochemical additive manufacturing systems and methods described herein. Specifically, metals and other types of materials can be deposited from electrolyte solutions using specially-configured electrode arrays. An electrode array comprises individually-addressable electrodes, arranged into a two-dimensional (2D) grid. These individually-addressable electrodes can be also referred to as microelectrodes or pixels (because of their relatively small size), while the electrode array can be also referred to as a microelectrode array. During the deposition operation, this electrode array is positioned proximate to a deposition electrode with an electrolyte solution provided therebetween. The current flow between the electrode array and the deposition electrode causes the deposition of material (i.e., by reducing cations provided in the electrolyte solution). As such, the electrode array is operable as an anode, while the deposition electrode is operable as a cathode. More specifically, each microelectrode in the array can allow a different level of current to flow through this electrode, independently from all other electrodes in the array. For example, individually-addressable electrodes can be individually turned on or off during the plating process thereby selectively controlling individual plating areas. These individually-addressable electrodes and selective control of individual plating areas may be referred to as a localized electrodeposition process.

More specifically, an electrochemical additive manufacturing system utilizes a specially-generated target map comprising individual target currents, one for each of the individually-addressable electrodes. In other words, the current flow through each electrode in the array is determined by the target map. These individual target currents are generated based on various performance characteristics of the system and also based on the desired properties of the deposited material as further described below.

Using a microelectrode array as an anode for electroplating provides more granular control of the current density distribution during the deposition operation. This feature can be used to mitigate various limitations within the system (e.g., achieving specific current densities with conventional two-electrode systems, electrolyte composition variations, etc.) and to achieve desired plating characteristics (e.g., material distribution, morphology, etc.). For example, uniform plating can be difficult to achieve when the plated surface (e.g., of the component positioned on the cathode) has a non-uniform gap with the anode. Specifically, parts of the cathode surface that are positioned closer to anode portions will experience higher current densities and, as a result, higher deposition rates than other parts of the cathode surface. The microelectrode array allows for reducing the current through the microelectrodes (associated with these closely-positioned anode portions) or for completely deactivating these microelectrodes thereby reducing the deposition at the corresponding cathode surface portions. Furthermore, the microelectrode array can be used to sense the deposition rates at different portions of the array (e.g., by sensing the current through each microelectrode) and use this information for updating the operating conditions to ensure that these deposition currents correspond to the individual target currents in the target map.

Examples of Electrochemical Additive Manufacturing Systems

FIG. 1A is a schematic illustration of electrochemical additive manufacturing system 100 used for depositing or, more specifically, electroplating material 190, in accordance with some examples. Electrochemical additive manufacturing system 100 comprises system controller 110, deposition power supply 120, deposition control circuits 130, electrode array 140, deposition electrode 150, and position actuator 170. System controller 110 is used for controlling the operations of various components. For example, FIG. 1A illustrates system controller 110 being communicatively coupled with position actuator 170, deposition power supply 120, and deposition control circuits 130. However, other types of communicative channels can be provided within system 100 as further described with reference to FIG. 3A. For example, system 100 can include various sensors providing feedback to system controller 110.

Position actuator 170 can be mechanically coupled to electrode array 140 and/or deposition electrode 150 and used to change the relative position of electrode array 140 and deposition electrode 150 (e.g., changing the gap between electrode array 140 and deposition electrode 150, linearly moving and/or rotating one or both electrode array 140 and deposition electrode 150 within a plane parallel to the electrode array 140). While FIG. 1A illustrates position actuator 170 being coupled to deposition electrode 150, other examples are also within the scope. The illustrated example allows for moving deposition electrode 150 while electrode array 140 remains stationary. For example, electrode array 140 can be more difficult to move because of various components and coupling to deposition control circuits 130. Electrode array 140 comprises individually-addressable electrodes 142, each connected to one of deposition control circuits 130. Each deposition control circuit 130 controls the current flow through the corresponding individually-addressable electrode 142, connected to that deposition control circuit 130 as further described below with reference to FIGS. 2A and 2B.

During the operation of electrochemical additive manufacturing system 100, system 100 also comprises electrolyte solution 180 comprising a source of ions that are reduced on deposition electrode 150 (operable as a cathode during this operation) and form material 190 on deposition electrode 150. More specifically, material 190 is deposited onto deposition electrode 150 from electrolyte solution 180 by flowing the electrical current between selected ones of individually-addressable electrodes 142 and deposition electrode 150. The selection of individually-addressable electrodes 142 determines the specific areas on deposition electrode 150 where this material 190 is deposited thereby allowing a very granular approach to the deposition. In some examples, further granularity is provided by controlling the current levels through each individually-addressable electrode 142. In other words, not only the current can be shut off through one or more individually-addressable electrodes 142 but different levels of current can be flowed through different individually-addressable electrodes 142.

Figure 1B:
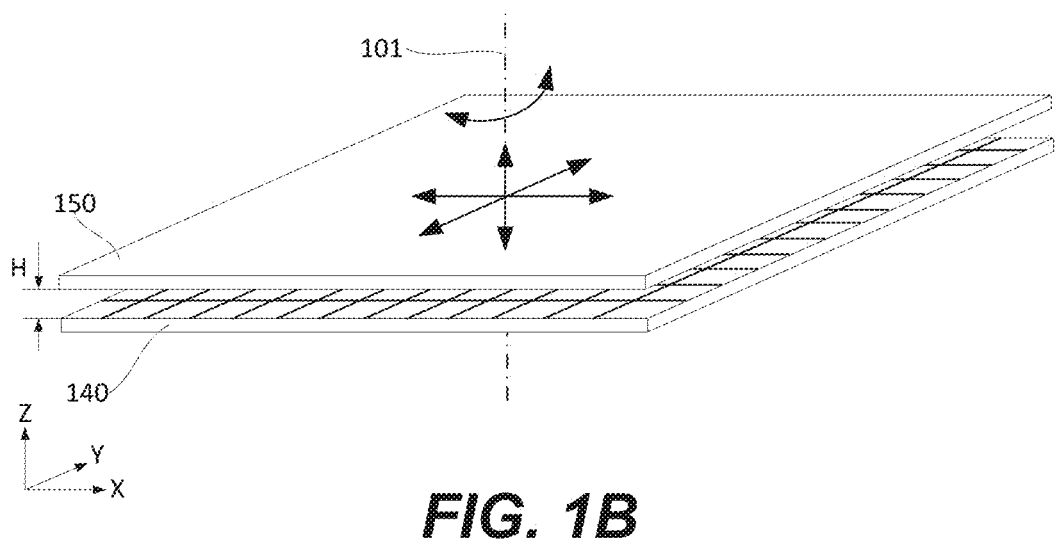
FIG. 1B is a schematic perspective view of a deposition electrode and an electrode array, formed by multiple individually-addressable electrodes, of the electrochemical-additive manufacturing system in FIG. 1A, in accordance with some examples.

FIG. 1B is a perspective schematic view of electrode array 140 and deposition electrode 150, in accordance with some examples. This combination of electrode array 140 and deposition electrode 150 may be also referred to as an electrodeposition cell, which is a primary component of electrochemical additive manufacturing system 100. Deposition electrode 150 and electrode array 140 form a gap, which is filled (partially or fully) with an electrolyte solution during the operation. The height (H) of this gap is specifically controlled (e.g., between 5 micrometers and 200 micrometers) as the height influences the deposition conditions. For example, an excessive gap height can result in lower deposition rates and less control over the deposition locations. On the other hand, a gap height below the target value can cause excessive deposition rates and even shorts. It should be noted that the height gap can be different at different portions of deposition electrode 150 and electrode array 140. Furthermore, the average gap height can change between various deposition and electrolyte flow stages (e.g., using position actuator 170). For example, the average gap height can be increased to reduce the average current flow between deposition electrode 150 and electrode array 140 (and vice versa). Furthermore, the gap can be increased (while the deposition is suspended) to flow fresh electrolyte solution into the gap. Overall, deposition electrode 150 and electrode array 140 can be moved relative to each in various directions as indicated in FIG. 1B, e.g., along primary axis 101 and/or within the plane perpendicular to primary axis 101 (including the rotation about primary axis 101).

Figure 1C:
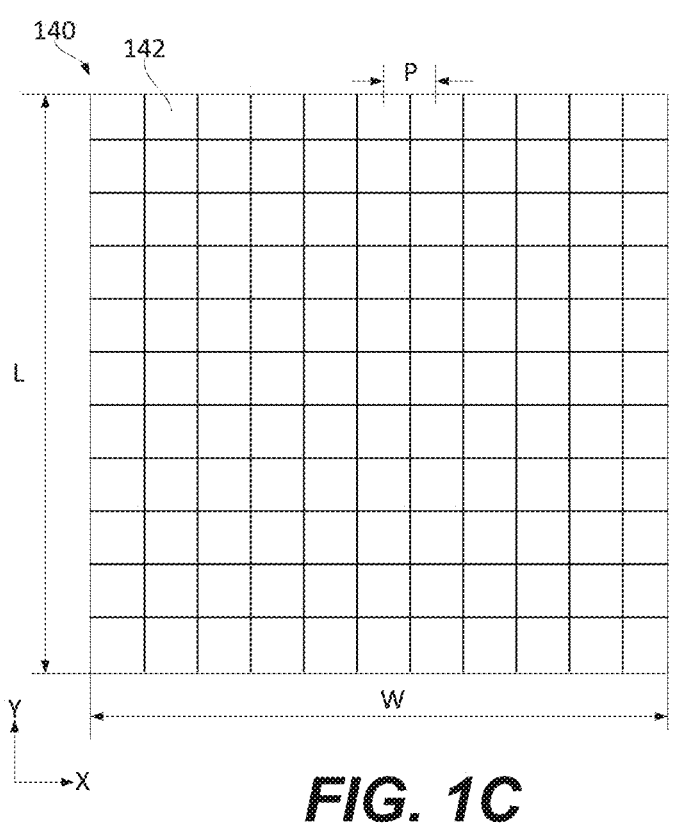
FIG. 1C is a schematic top view of the electrode array in FIG. 1B, in accordance with some examples.

Referring to FIG. 1C, electrode array 140 comprises individually-addressable electrodes 142, which may be also referred to as grid regions, microelectrodes (or micro-anodes), and/or pixels. More specifically, electrochemical additive manufacturing system 100 allows applying individual voltages (relative to deposition electrode 150) to each of individually-addressable electrodes 142. This individually-addressable feature allows the achievement of different deposition rates at different locations on deposition electrode 150. Individually-addressable electrodes 142 form a deposition grid, in which these portions may be offset relative to each other along the X-axis and Y-axis. The grid may be characterized by a grid X-axis resolution (corresponding to the number of grid regions along the X-axis), grid Y-axis resolution (corresponding to the number of grid regions along the Y-axis), grid X-axis pitch (corresponding to the length of each grid region along the X-axis), grid Y-axis pitch (corresponding to the length of a grid region along the Y-axis), overall grid pitch (corresponding to the minimum of the grid X-axis pitch and the grid Y-axis pitch), and grid region area. In some examples, one or both of the grid's X-axis resolution and the Y-axis resolution is between 50 and 500, such as between 75 and 250. In the same or other examples, one or both of the grid's X-axis pitch and the Y-axis pitch are 100 micrometers or less, 50 micrometers or less, or even 35 micrometers or less. Other example grids include triangular, hexagonal, or other patterns that partially or tessellate a surface. In some examples, individually-addressable electrodes 142 are formed from an insoluble conductive material, such as platinum group metals and their associated oxides, doped semiconducting materials, and carbon nanotubes.

Figure 2A:
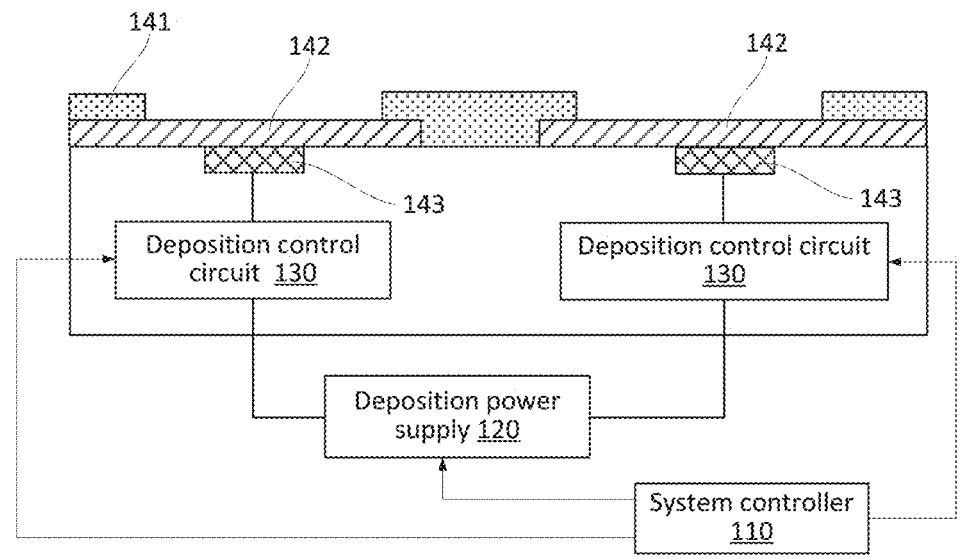
FIG. 2A is a schematic side cross-sectional view of two deposition control circuits and corresponding individually-addressable electrodes, in accordance with some examples.

Each deposition control circuit 130 may be connected to the corresponding individually-addressable electrode 142. For example, FIG. 2A illustrates two deposition control circuits 130 and corresponding individually-addressable electrodes 142, in accordance with some examples. The connection can be provided at least in part by contact pads 143, extending below individually-addressable electrodes 142. Deposition control circuits 130 are electrically connected to deposition power supply 120 and communicatively coupled to system controller 110. In some examples, individually-addressable electrodes 142 are at least partially covered by insulators 141 that control the area of each individually-addressable electrode 142 exposed to electrolyte solution 180 and also the spacing between such exposed areas of two adjacent individually-addressable electrodes 142. As noted above, each deposition control circuit 130 controls the conductivity or the amount of current flowing through the corresponding individually-addressable electrode 142. In some examples, the current density supplied to individually-addressable electrodes 142 can be up to 125 mA per square centimeter or more, such as 250 mA or more, 500 mA or more, 750 mA or more, or even 1 A per square centimeter or more. However, lower current densities are also within the scope.

Figure 2B:
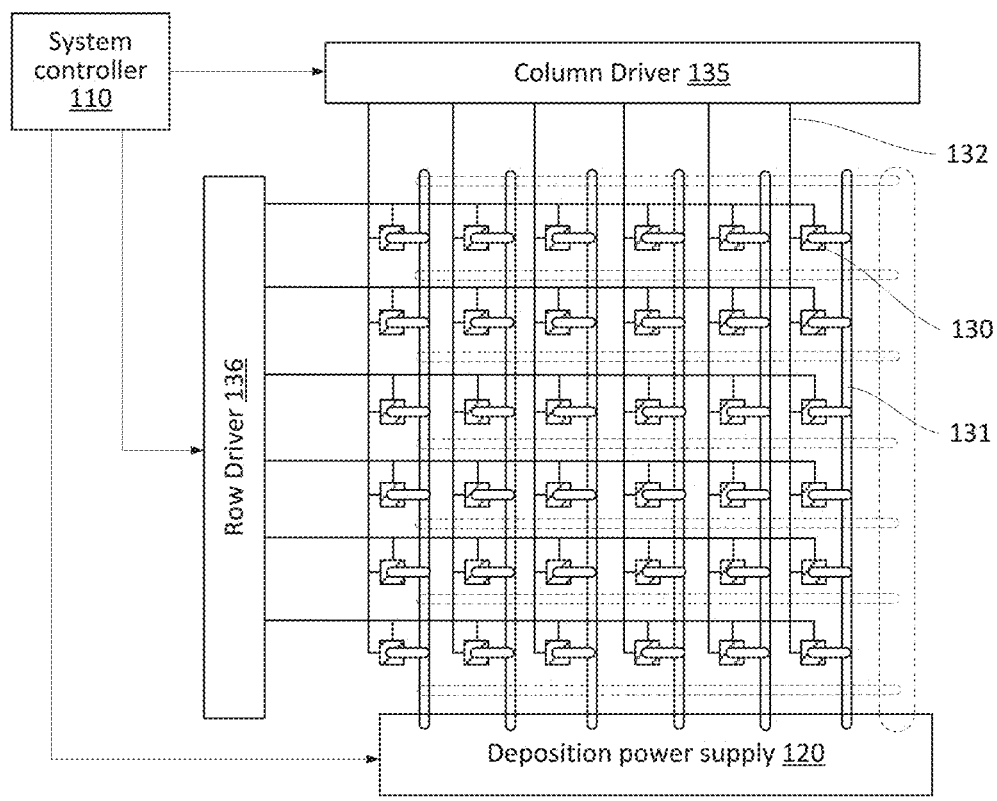
FIG. 2B is a schematic illustration of deposition control circuits used for independently controlling the current flow through each individually-addressable electrode, in accordance with some examples.

FIG. 2B is a schematic illustration of an array formed by deposition control circuits 130 and various control elements, in accordance with some examples. For example, each deposition control circuit 130 may have a first switching element controlled by a corresponding row trace (coupled to row driver 136) and a second switching element controlled by a column trace (coupled to column driver 135). In some examples, the second switching element can be controlled when the first switching element is active. Specifically, the second switching element may control the amount of current flowing to each individually-addressable electrode 142 from bus bars 131, which is connected to each deposition control circuit 130 and deposition power supply 120, e.g., as shown in FIG. 2B. In some examples, bus bars 131 form a grid (linear or multi-dimensional) to ensure adequate conductivity to each deposition control circuit 130. Similarly, control lines 132 (connected to each deposition control circuits 130 and also to row driver 136/column driver 135) can form a grid. Row driver 136, column driver 135, and deposition power supply 120 are communicatively coupled and controlled by system controller 110. The switching elements may be, for example, thin film transistors, such as those made from low-temperature polycrystalline silicon or indium gallium zinc oxide. In the same or other examples, a deposition control circuit may also have a storage capacitor that is charged when the first switching element is active and when the associated column trace is energized. The storage capacitor may maintain the state of the second switch element after the first switching element is deactivated.

Examples of System Controllers and Target Maps

Figure 3A:
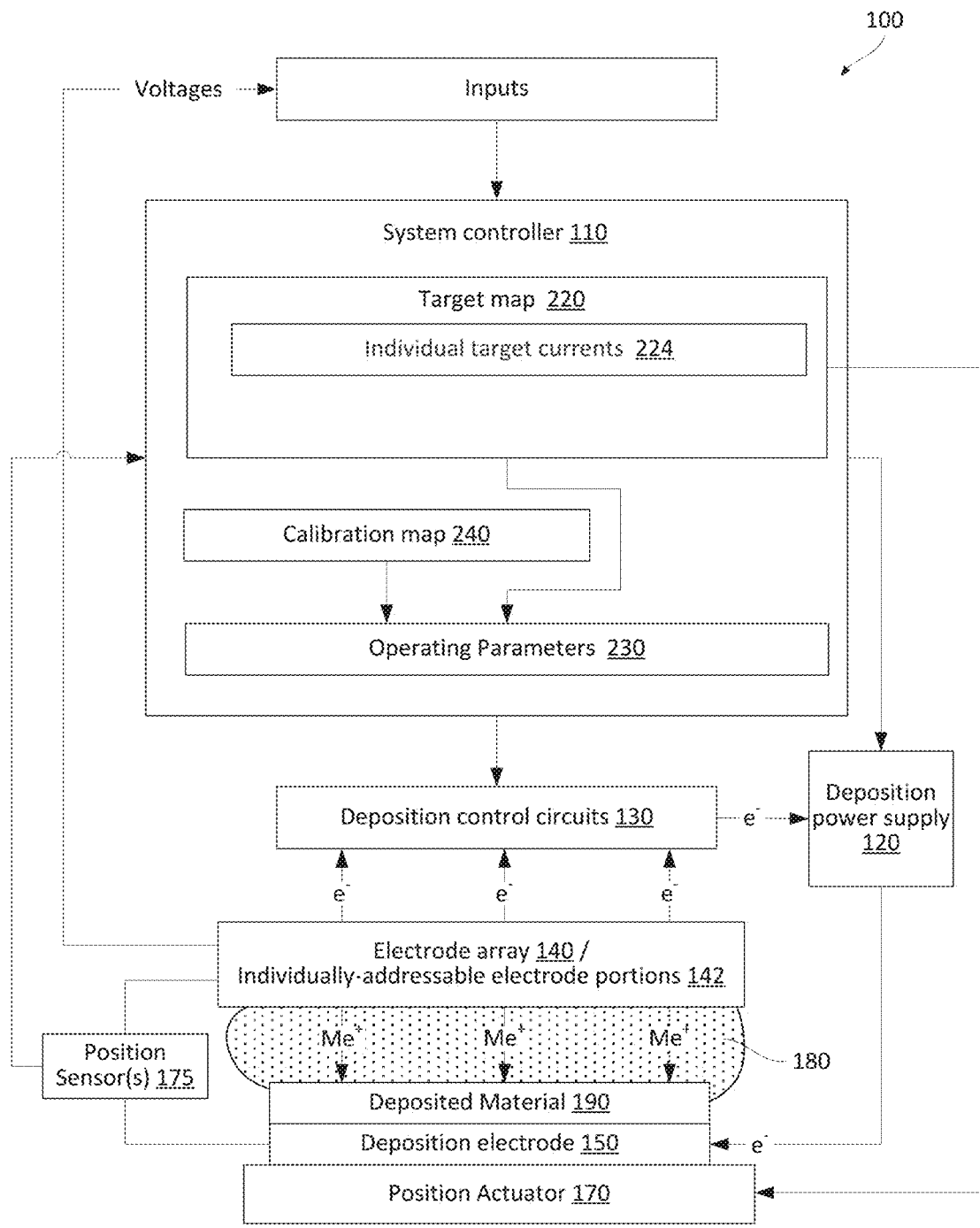
FIG. 3A is a block diagram of the electrochemical-additive manufacturing system in FIG. 1A, illustrating various features of the system controller used for the system's operation, in accordance with some examples.

Various aspects of system controller 110 and target map 220 as well as other control features of electrochemical additive manufacturing system 100 will now be described with reference to FIG. 3A. System controller 110 can include a microcontroller, a microprocessor, a Graphics Processing Unit (GPU), a Field-Programmable Gate Array (FPGA), a System-On-Chip (SoC), a single-board computer, a laptop, a notebook, a desktop computer, a server, or a network or combination of any of these devices. System controller 110 may communicate with various components, such as position sensors 175.

Specifically, system controller 110 comprises target map 220 used to control the operation of electrode array 140 or, more specifically, each of individually-addressable electrodes 142 through individually controlling each deposition control circuit 130. Specifically, target map 220 comprises individual target currents 224, one for each of individually-addressable electrodes 142 as, e.g., is schematically shown in FIG. 3B. The current flow through each individually-addressable electrode 142 at any given time is independently controlled by each deposition control circuit 130 based on a corresponding one of individual target currents 224 in target map 220. For example, different currents may be flowed through different individually-addressable electrodes 142 to achieve a specific deposition topography (e.g., deposition in selected areas), to mitigate variations within electrolyte solution 180 (e.g., bubbles, compositional variations) while achieving the uniform deposition, and other reasons.

In some examples, bus bars 131 and/or deposition control circuit 130 can create various nonuniformities during the operation of electrochemical additive manufacturing system 100. For example, deposition control circuit 130 can have some variations in transistors' on-resistance. In applications that require high charge-density precision, this variation may be significant. Such variations can be accounted for during the calibration of electrochemical additive manufacturing system 100, which involves measuring the inherent conductivity of the entire array by sequentially activating each individually-addressable electrode 142 while individually-addressable electrodes 142 are positioned in a controlled electrolyte solution (e.g., a solution comprising sulfuric acid, an aqueous ferric/ferrous ion solution). This information can be stored in calibration map 240 of system controller 110, e.g., as schematically shown in FIG. 3A. Specifically, calibration map 240 can be used by system controller 110 to generate operating parameters 230 based on individual target currents 224 (e.g., effectively performing a Mura correction). For example, calibration map 240 can be generated based on various parameters of electrochemical additive manufacturing system 100, such as the resistance of lines connecting each individually-addressable electrode 142 to deposition power supply 120, characteristics (e.g., material) of individually-addressable electrode 142, characteristics (e.g., composition of electrolyte solution 180), and the like.

In some examples, bus bars 131 can be in the form of thin film metal layers or other types of structures with limited conductivity (e.g., because of the spacing constraints) around deposition control circuits 130 (in particular when the array has a high density). At the same time, each deposition control circuit 130 and as a result, each bus bar 131, may require to carry substantial levels of currents. As such, when electrode array 140 spans a large area, significant ohmic losses may result within electrode array 140, e.g., in individually-addressable electrodes 142 connected to the longest bus bars/positioned further away from the edge-located drivers. This variation can be accounted for and counteracted with computational means. Since the resistance (typically non-isotropic) of the bus bars, the voltage at each individually-addressable electrode 142 can be calculated using numerical methods by estimating the voltage drop. This allows for corrective measures using true grayscale or dithered array control to ensure that the current at each pixel is more uniform. Similar to the examples above, this information can be stored in calibration map 240, which is used by system controller 110 to generate operating parameters 230 based on individual target currents 224.

In some examples, higher uniformity may be achieved by increasing the internal impedance in the array, e.g., by underdriving or under-sizing deposition control circuits 130 or, in some examples, the transistors used within deposition control circuits 130. This feature helps to reduce the voltage variations in the bus bars (forming a current-carrying layer). In other words, individual transistors are current-limiting points (chokepoints) in the overall current flow.

Figure 4A:
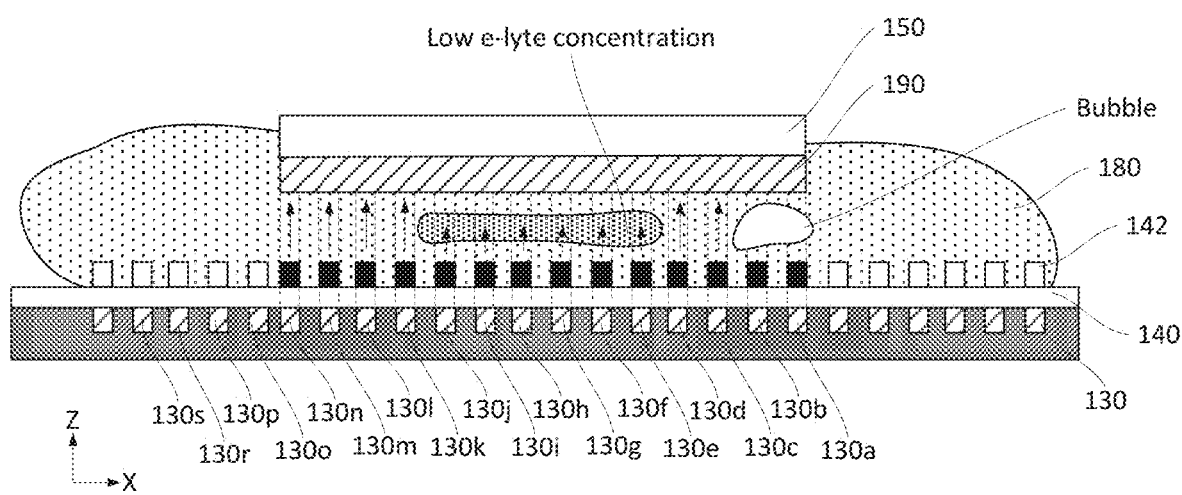
FIG. 4A is a schematic illustration of the deposition electrode and electrode array illustrating various byproducts being formed in the electrolyte solution as a part of the deposition, in accordance with some examples.

In some examples, electrodeposition using inert materials for individually-addressable electrodes 142 (operable as anodes), such as platinum, can result in the evolution of gas at the electrode surfaces. These gas bubbles impede current flow at corresponding individually-addressable electrodes 142, e.g., as schematically shown in FIG. 4A, and reduced or complete lack of deposition. Such bubble-driven current variations are stochastic or otherwise hard to model. These variations can be overcome by feedback, using an additional multi-channel voltage measurement device to monitor the voltage at each individually-addressable electrode 142 at some frequency. This voltage can be used to estimate the instantaneous current at each individually-addressable electrode 142 during the plating process and correct for non-uniformities. This method can also be used for the correction of ohmic losses (describe above).

In some examples, the gap between individually-addressable electrodes 142 and the deposited surface of material 190 (on deposition electrode 150) is determined using amperometry (e.g., operating adjacent individually-addressable electrodes 142 at different potentials and monitoring the difference in current). For example, some compositions of electrolyte solution 180 can cause the corrosion of the deposit thereby producing species that enhance the current response having diffused to the anode. In a specific example, the corrosion of copper in a bath containing acid and oxygen can produce $Cu^+$ ions that can become oxidized at the anode to $Cu^{2+}$ ions. Since the diffusion of these species is a function of, among other things, distance and time, the measured current response corresponds to the distance to the deposit. This measurement can be especially effective when the deposition is occurring inside negative features such as photoresist wells, since these features may prevent the rapid diffusion of active species. Varying flow regimes and inter-electrode distances may also be used to enhance the mapping response.

Figure 4B:
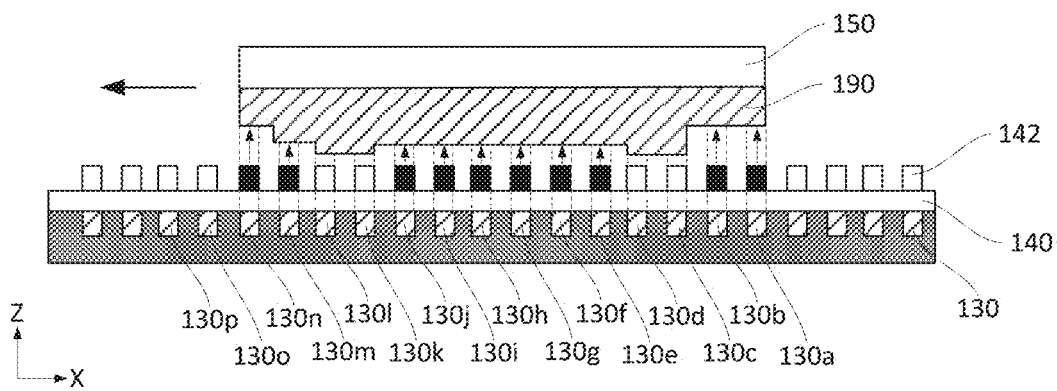
FIGS. 4B-4C are schematic illustrations of moving the deposition electrode and electrode array relative to each other while preserving the deposition locations on the deposition electrode, in accordance with some examples.
Figure 4C:
Figure 4C:
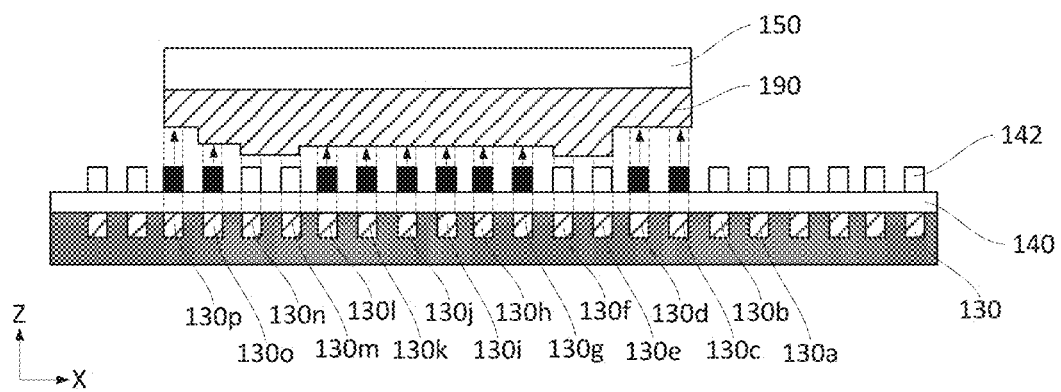

In some examples, electrode array 140 and deposition electrode 150 are moved relative to each other, e.g., to improve plating uniformity. For example, the movement can be used to supply fresh electrolyte solution 180 to all individually-addressable electrodes 142 and removed the used solution (which may be depleted from various components and/or include undesirable components such as bubbles). The reference between all individually-addressable electrodes 142 and plating sites on deposition electrode 150 is maintained by dynamically updating target map 220 based on the relative position of electrode array 140 and deposition electrode 150 as will now be described with reference to FIGS. 4B and 4C. Specifically, FIG. 4B illustrates the initial position of electrode array 140 and deposition electrode 150. Individually-addressable electrodes 142 are selectively activated by corresponding deposition control circuits 130 to ensure the uniform plating of material 190. Specifically, FIG. 4B illustrates an example where the uneven surface of material 190 is corrected by selective plating. Deposition control circuits 130*a*, 130*b*, 130*e*-130*j*, 130*m*, and 130*n* are activated (to ensure plating in the corresponding areas), while the remaining deposition control circuits are deactivated. FIG. 4C illustrates a shifted position of electrode array 140 and deposition electrode 150. Specifically, in this shifted position, deposition electrode 150 (and material 190 supported on deposition electrode 150) is moved by two pixels/individually-addressable electrodes 142 to the left relative to electrode array 140. To ensure the deposition of the same material portion, deposition control circuits 130*c*, 130*d*, 130*h*-130*l*, 130*o*, and 130*p* are now activated (to ensure plating in the corresponding areas), while the remaining deposition control circuits are deactivated.

Furthermore, electrode array 140 can move relative to deposition electrode 150 (e.g., using position actuator 170) while system controller 110 dynamically updates target map 220. Electrode array 140 and deposition electrode 150 can move relative to each other for various reasons. For example, electrode array 140 can be smaller than deposition electrode 150, and new areas/portions of deposition electrode 150 can be deposited by moving electrode array 140 and aligning electrode array 140 with these new areas. In these examples, electrode array 140 can be referred to as a printhead or, more specifically, an electrodeposition head. In the same or other examples, the movement is used to remove used electrolyte solution 180 (which may contain undesirable deposition byproduct, e.g., bubbles, and have reduced concentrations of precursors) and introduce fresh electrolyte solution 180 into the gap between electrode array 140 and deposition electrode 150. It should be noted that this gap can be relatively small and it may be difficult to flow electrolyte solution 180 through this gap. For example, some areas in this gap (e.g., away from the electrode edges) can be particularly difficult to access. The movement of electrode array 140 and deposition electrode 150 relative to each other (e.g., which may include increasing the gap) can be used to stimulate this flow. Furthermore, electrode array 140 and deposition electrode 150 can be moved (relative to each other) to "de-focus" the electrical field, e.g., to purposely cause the deposit to be less uniform.

System controller 110 can dynamically update target map 220 based on the relative position of electrode array 140 and deposition electrode 150, which can be obtained from position actuator 170 and/or various positioning sensors. It should be noted that the positioning precision should be smaller than the center-to-center dimension of the individually-addressable electrodes 142 (e.g., a pitch). Furthermore, a combination of various sensors and system controller 110 can be used to detect when electrode array 140 is in contact or in close proximity to deposited material 190, which can be used to control that gap.

Overall, electrode array 140 can be moved relative to deposition electrode 150 or, more specifically, to deposited material 190 for purposes of loading/unloading a new substrate (onto deposition electrode 150), mitigating nonuniformities in the local flow velocity (e.g., flow paths of electrolyte solution 180 around and between electrode array 140 and deposited material 190) and the composition of electrolyte solution 180 (e.g., precursor ion concentrations). Target map 220 is dynamically updated to match this movement. In some examples, the initial electrode activation pattern is modified as the substrate enters or exits the plating cell for reasons such as a "hot entry". Specifically, cathodic potential/protection is provided to the workpiece to avoid seed layer corrosion. In another example, the substrate may enter electrolyte solution 180 from one edge to another, and the modified pattern is used to compensate various times across the surface during this entry.

In some examples, the gap height between electrode array 140 and deposited material 190 is changed during the deposition process by moving electrode array 140 and deposition electrode 150 relative to one another. This movement may be used to modulate the current density field on deposited material 190 as the currency density field is heavily dependent on this gap height. For example, when the energized anode pattern is kept the same while increasing the gap between electrode array 140 and deposited material 190, the current field would effectively "defocus" on deposited material 190, e.g., spreading out and blurring discrete regions. This feature can be used in some examples, e.g., otherwise, the energized anode patterns could be shrunk in the same order to maintain a similar (but less intense) pattern definition.

In some examples, electrolyte solution 180 comprises one or more feedstock ion sources that generate ions or, more specifically, cations that are used to form deposited material 190 when combined with electrons on deposition electrode 150. In addition to metal cations (e.g., copper ions, nickel ions, tungsten ions, gold ions, silver ions, cobalt ions, chrome ions, iron ions, and tin ions), other types of cations are within the scope (e.g., polymers such as polypyrrole. Some specific examples of feedstock ion sources include, but are not limited to, copper sulfate, copper chloride, copper fluoroborate, copper pyrophosphate, copper cyanide, nickel sulfate, nickel ammonium sulfate, nickel chloride, nickel fluoroborate, zinc sulfate, sodium thiocyanate, zinc chloride, and ammonium chloride. In some examples, feedstock ion sources, or other sources of cations (e.g., salts) are referred to as material concentrates.

In some examples, the solvent is selected from the group consisting of water, molten salts (e.g., LiCl—KCl, NaCl—KCl, LiF—NaF—KF, LiF—CaF2, sulfonium [R3S] based salts, and phosphonium [R3P]+ based salts), organic solvents (e.g., aromatic, dimethylsulfone, acetone, and acetates), ionic liquids (e.g., quaternary ammonium salts (tetraalkylammonium), [R4N]+ based, cyclic amines: aromatic (pyridinium, imidazolium) and saturated (piperidinium, pyrrolidinium) ones.

In some examples, electrolyte solution 180 comprises one or more acids, such as sulfuric acid, acetic acid, hydrochloric acid, nitric acid, hydrofluoric acid, boric acid, citric acid, and phosphoric acid. In some examples, electrolyte solution 180 comprises one or more additives, such as an accelerator, a suppressor, a brightener, a grain refiner, a leveler, particulates for co-deposition (e.g., nanoparticles and microparticles such that diamond particles, tungsten particles, chromium particles, and silicon carbide particles).

Examples of Electrochemical-Additive Manufacturing Methods

Figure 5:
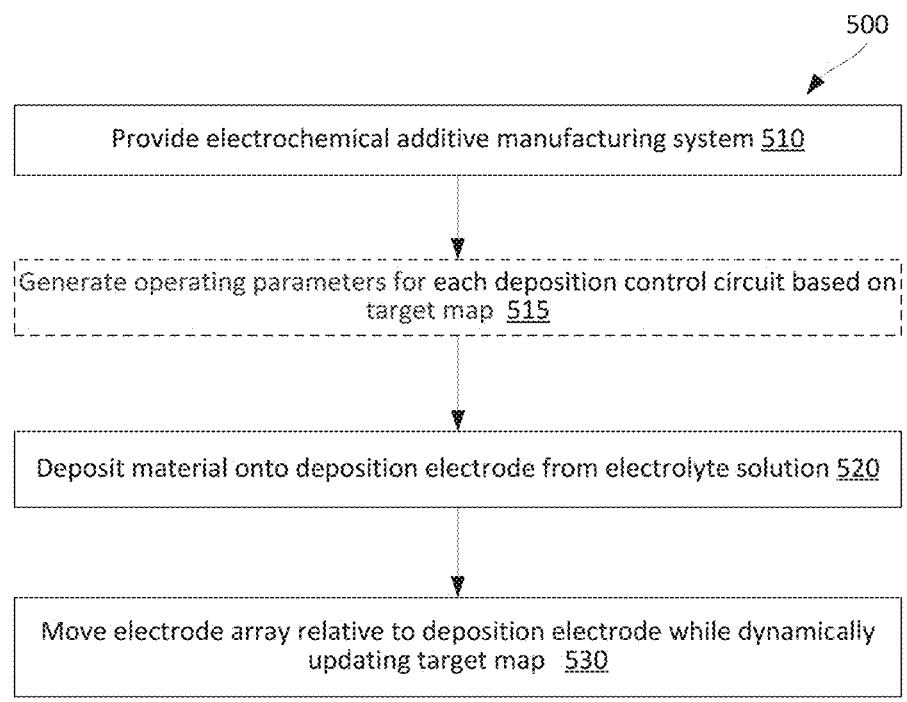
FIG. 5 is a process flowchart corresponding to a method of electrochemical additive manufacturing using an electrochemical additive manufacturing system, in accordance with some examples.

FIG. 5 is a process flowchart corresponding to electrochemical-additive manufacturing method 500, in accordance with some examples. Method 500 may commence with (block 510) providing electrochemical additive manufacturing system 100 various examples of which are described above with reference to FIGS. 1A-4C. Specifically, electrochemical additive manufacturing system 100 comprises system controller 110, deposition power supply 120, deposition control circuits 130, electrode array 140, deposition electrode 150, and electrolyte solution 180 (which may be added to electrochemical additive manufacturing system 100 during this providing operation). As noted above, deposition control circuits 130 are communicatively coupled to system controller 110 and electrically coupled to deposition power supply 120. Electrode array 140 comprises individually-addressable electrodes 142. Each individually-addressable electrode 142 is electrically coupled to one of deposition control circuits 130. System controller 110 comprises target map 220 comprising individual target currents 224, one for each of individually-addressable electrodes 142.

In some examples, target map 220 is generated or dynamically updated (during the deposition operation further described below) using system controller 110 based on one or both voltage and current values, sensed by each deposition control circuit 130. For example, system controller 110 can instruct deposition control circuit 130 to apply a set voltage to the corresponding individually-addressable electrode 142 (relative to deposition electrode 150) and to monitor the resulting current as a part of this voltage application. Based on this voltage-current feedback, system controller 110 can then determine a new set voltage or a new set current that is used in target map 220. This voltage-current feedback can be a result of various operating conditions, such as electrolyte characteristics (e.g., temperature, conductivity, flow rate, components' concentrations), and the distance between electrode array 140 and deposited material 190. This process can be repeated over time to compensate for any new changes (e.g., the geometry or material of deposited material 190, the chemical composition of electrolyte solution 180, and the distance between electrode array 140 and deposited material 190). In some examples, the model that correlates pixel voltage/current to the current gradient on the substrate can be determined or refined empirically by repeatedly forming and analyzing deposited material 190 in a controlled manner (e.g., using profilometry, interferometry, computed tomography (CT) scanning, and/or laser scanning to characterize the thickness of patterns across the surface).

The voltage or current profile commanded of electrode array 140 can also be verified by utilizing various analysis techniques. For example, electrode array 140 can be configured such that the voltage at the electrode surface (or current through the electrode is converted to a voltage by reading the voltage across a known resistance) can be measured. For example, an Analog-to-Digital (ADC) converter can be connected to individually-addressable electrodes 142 to obtain the values across the array. In some examples, multiplexing techniques can be used with individually-addressable electrodes 142 in a given row or column sharing a common readout line. This line connects this individually-addressable electrode 142 via a switchable transistor element enabling a scan of the array voltage/current to be read out via the shared readout lines. The obtained voltage/current values can then be compared against the desired values that were determined previously (during the system modeling) and have corrective factors applied if required. These corrective factors can be used to increase or decrease the voltage/current supplied from a given individually-addressable electrode and modulate its associated impact on the deposit on the workpiece. This can be achieved in several ways some of which are further described below (e.g., "grayscaling" of the pixel power by increasing or decreasing the voltage at the gate of the pixel transistor to modulate the voltage/current passing through it), increasing or decreasing the time or time fraction that a given pixel remains on relative to others, or by modulating the mechanical position of the electrode relative to the workpiece). These techniques can be used individually or in various combinations to provide the desired compensation. These techniques can be used for the setting of the initial current field at the electrode array and therefore the associated workpiece. Furthermore, these techniques can continually be used throughout the deposition process as a means to maintain the current profile against the target (e.g., whether the current profile remains constant or varies during the deposition process or between deposition processes).

In some examples, target map 220 is dynamically updated based on desired variations in material 190. For example, target map 220 can be updated to achieve uniform deposition of material 190 (e.g., increase the current to individually-addressable electrodes 142 that are spaced further away from the surface of deposited material 190).

In some examples, target map 220 comprises instructions for at least two deposition control circuits 130 to simultaneously pass different levels of electrical current through at least two individually-addressable electrodes 142. As such, target map 220 can be used to achieve various levels of grayscale control, e.g., either by completely turning off some individually-addressable electrodes 142 or at least varying the current levels through different individually-addressable electrodes 142.

In some examples, the impedance of the drain-source circuit of transistors inside thin-film transistor (TFT)-based arrays (in deposition control circuits 130) is modulated by applying different gate voltages. Using a constant drain voltage, this approach can allow for fine control of the current at the source terminal. Overall, this approach allows for different pixels on the same array to simultaneously output different currents.

In some examples, a thin-film transistor (TFT)-based array (operable as electrode array 140) is updated as a whole "frame", meaning that there is some fixed period over which every pixel in the array is written into (e.g., about 5-30 ms). Each pixel can therefore be enabled or disabled at different frequencies and duty cycles that are compatible with the fundamental frame period. For example, if the frame period is 10 ms, a pixel can be turned on for 10 ms, then turned off for 10 ms, resulting in a 50% duty cycle on a 50 Hz waveform. This allows for time-averaged current densities to be different on different pixels.

In some examples, individual target currents 224 of target map 220 comprise zero-current values corresponding to a subset of individually-addressable electrodes 142. In other words, this subset does not provide any current flow and does not participate in any deposition. Furthermore, the electrode portions in a subset are distributed among individually-addressable electrodes 142 according to one of a Bayer matrix, a dispersed dot halftoning, a clustered-dot matrix, or a Jarvis error diffusion. This selection provides dithered array control during the electroplating of material 190. Specifically, in some examples, the current density on the cathode plane needs to be modified over scales that are larger than each individually-addressable electrode 142 (i.e., the pixel size). In these examples, the cathodic current density can be modulated by controlling the density of activated individually-addressable electrodes 142. These dithering methods are used to convert a desired current density distribution (e.g., represented as a grayscale image) to a binary image (e.g., represented as a subset of enabled individually-addressable electrodes 142).

In some examples, individual target currents 224 are selected based on a charge density associated with each individually-addressable electrode 142. For example, when plated thickness uniformity is the primary concern, the charge density (rather than the current density) can be used as a primary parameter. For example, the process may involve maintaining the uniform current density over a set of individually-addressable electrodes 142. A subset of these electrodes, corresponding to the areas of material 190 where less plating is desired, can be deactivated at a set time In some examples, target map 220 is generated based on at least one of (a) desired deposition rates, (b) grain sizes with material 190, (c) grain orientations within material 190, (d) compositions of material 190, (e) brightness values of material 190, or (f) densities of material 190. For example, a deposition rate is directly proportional to the current. A lower ionic concentration may require a higher voltage to achieve the same deposition rate. Specifically, plating currents can significantly impact the resulting plated material properties. For instance, during copper plating, an increase in current density will decrease the grain size of the deposited copper. Furthermore, excessive current densities can cause burned (oxidized) depositions and significant porosity inclusions leading to low density.

In some examples, target map 220 is generated based on one or more of (a) the temperature of electrolyte solution 180, (b) the conductivity of electrolyte solution 180, (c) the flow rate of electrolyte solution 180, (d) the composition of electrolyte solution 180, and (e) distance between material 190 and individually-addressable electrodes 142. For example, a higher temperature usually corresponds to higher ionic mobility and requires a lower voltage to achieve the same deposition rate. Similarly, the electrolyte conductivity has an impact on the required current-voltage characteristics. The composition of electrolyte solution 180 has an impact on ionic mobility, conductivity, and many other characteristics. Finally, the impact of the distance between material 190 and individually-addressable electrodes 142 has been discussed above.

In some examples, method 500 further comprises (block 515) generating operating parameters 230 for each deposition control circuit 130 based on target map 220. For example, operating parameters 230 are generated using system controller 110 based on calibration map 240 associated with at least one of an on-resistance of each of deposition control circuits 130 or ohmic losses associated between deposition power supply 120 and each of deposition control circuits 130. For example, the current-voltage feedback can be stored in calibration map 240 and used to generate operating parameters 230. In some examples, this operation is optional, and individual target currents 224 from target map 220 are used as operating parameters 230.

Method 500 proceeds with (block 520) depositing material 190 onto deposition electrode 150 from electrolyte solution 180 by flowing a current between each individually-addressable electrode 142 and deposition electrode 150. This current is independently controlled by each deposition control circuit 130 based on the corresponding individual target current 224 in target map 220. In some examples, the currents are different for individually-addressable electrodes 142.

Method 500 may involve (block 530) moving electrode array 140 relative to deposition electrode 150 while system controller 110 dynamically updates target map 220 based on the relative position of electrode array 140 and deposition electrode 150.

In some examples, electrode array 140 moves relative to deposition electrode 150 in the direction substantially parallel to the plane of individually-addressable electrodes 142. For example, this movement may be used for depositing material 190 in the new areas of deposition electrode 150. More specifically, electrode array 140 is linearly translated relative to deposition electrode 150. In the same or other examples, electrode array 140 is rotated relative to deposition electrode 150. In the same or other examples, electrode array 140 moves relative to deposition electrode 150 in the direction substantially perpendicular to the plane of individually-addressable electrodes 142 thereby changing the gap between electrode array 140 and deposition electrode 150.

In some examples, electrode array 140 moves relative to deposition electrode 150 while material 190 is being deposited onto deposition electrode 150 from electrolyte solution 180. In other words, the deposition and the current flow through individually-addressable electrodes 142 continues while electrode array 140 moves relative to deposition electrode 150. As noted above, target map 220 is dynamically updated based on the relative position of electrode array 140 and deposition electrode 150. Target map 220 is then used to adjust the operating conditions of individually-addressable electrodes 142, also based on the relative position of individually-addressable electrodes 142 to the deposition sites on material 190.

In some examples, electrode array 140 moves relative to deposition electrode 150 using electrode-position actuator 170 controlled by system controller 110, in response to sensor input received by system controller 110. For example, the sensor input represents at least one of (a) bubbling in electrolyte solution 180 provided at least between electrode array 140 and deposition electrode 150, and (b) composition variations in electrolyte solution 180 provided at least between electrode array 140 and deposition electrode 150 e.g., as schematically shown in FIG. 4A and described above.

In some examples, controller 110 further receives positioning-sensor input from one or more position sensors and uses positioning-sensor input to dynamically update target map 220. For example, the sensor input may be received by system controller 110 from each of deposition control circuits 130. In these or other examples, the sensor input corresponds to one or both of a voltage value and a current value, sensed by each of deposition control circuits 130.

Experimental Results

Figure 6A:
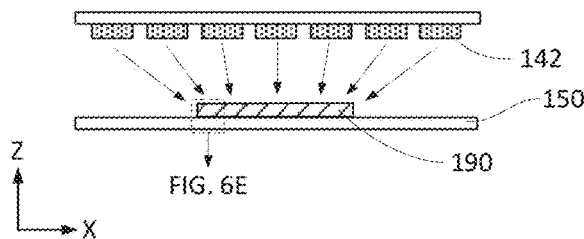
FIGS. 6A and 6B are schematic side cross-sectional views of two examples of using different sets of individually-addressable electrodes for depositing the material on the deposition electrode.
Figure 6B:
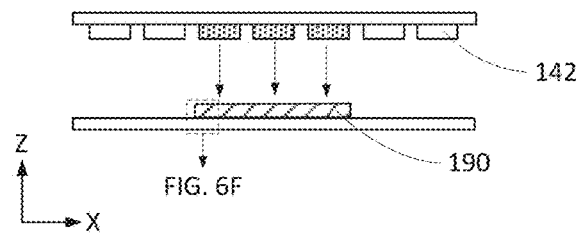
Figure 6C:
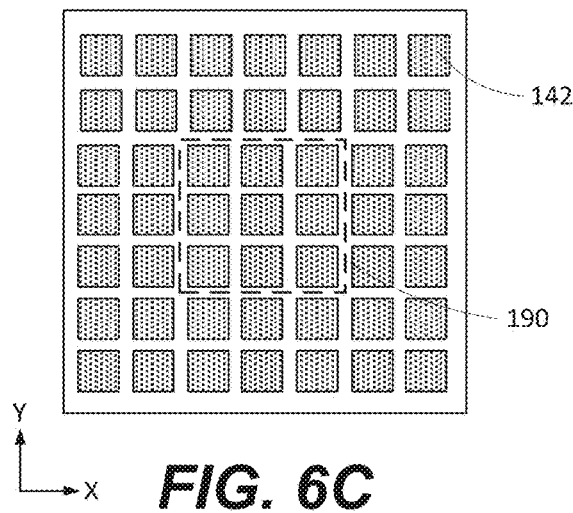
FIGS. 6C and 6D are schematic top views of the two examples in FIGS. 6A and 6B of using different sets of individually-addressable electrodes for depositing the material on the deposition electrode.
Figure 6D:
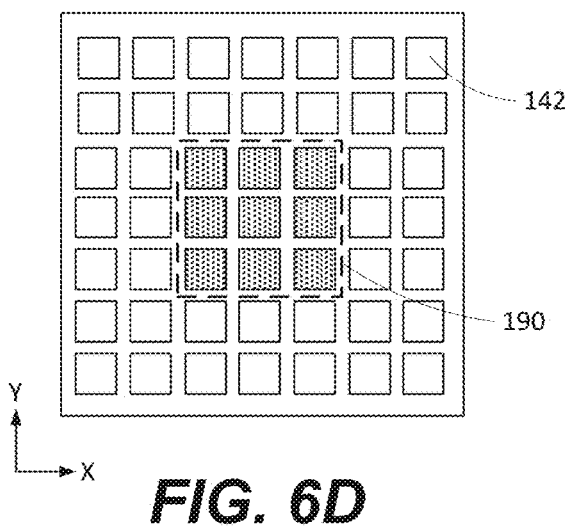

Several experiments have been conducted to determine the effect of target maps to selectively operate individually-addressable electrodes 142. FIGS. 6A-6F corresponds to the experiment used for controlling the edge quality of the plated material. Specifically, FIGS. 6A and 6B are schematic side views of two different experimental setups, both including electrode arrays that are wider than the deposited material. The difference is which individually-addressable electrodes 142 were activated (using a target map). Specifically, FIG. 6A illustrates all individually-addressable electrodes 142 being activated, even the electrodes beyond the footprint of the plated material 190. It should be noted that this footprint may be determined by a conductive area formed on deposition electrode 150 (e.g., by previously depositing a seed layer or other means). FIG. 6B illustrates another setup in which activated electrodes are only positioned over the deposition footprint. Any individually-addressable electrodes 142 positioned beyond that footprint are deactivated. FIGS. 6C and 6D represent corresponding top views.

Figure 6E:
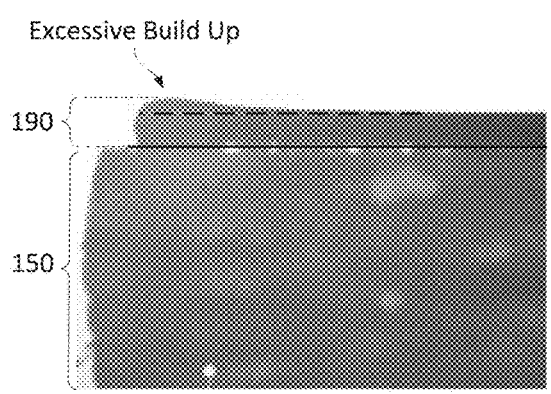
FIGS. 6E and 6F are photos illustrating the corners of two different deposited material samples, corresponding to the two examples in FIGS. 6A and 6B and FIGS. 6C and 6D.
Figure 6F:
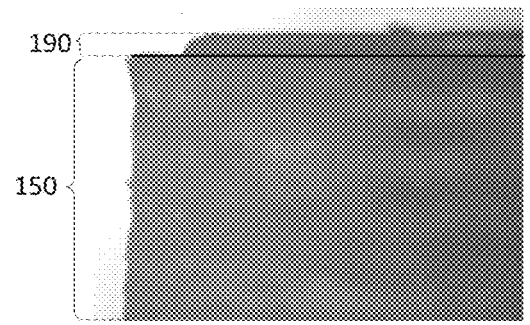

Passing a set current through each electrode causes the corresponding amount of material to be deposited on deposition electrode 150. However, the location of this electrode also determines the location where this material is deposited. First, the material has to be deposited in the conductive portion of deposition electrode 150. Second, the material will deposit at the closest possible site (based on the cathode current density). As a result, any electrodes 142 positioned outside of the conductive footprint will cause deposition around the edges of this conductive footprint as evidenced by the image in FIG. 6E. Specifically, FIG. 6E illustrates a cross-sectional view of a copper layer deposited over a substrate using an experimental setup similar to FIGS. 6A and 6C. The edge deposit has an excessive build-up. FIG. 6F illustrates a similar cross-sectional view of another copper layer deposited over a substrate using an experimental setup similar to FIGS. 6B and 6D without illustrating any edge build-up.

Figure 7A:
FIG. 7A is a cross-sectional view of four copper deposits, each corresponding to a different ratio of activated individually-addressable electrodes (i.e., from left to right—100% active, 75% active, 50% active, and 25% active).

FIG. 7A is a cross-sectional view of four copper deposits, each corresponding to a different ratio of activated individually-addressable electrodes (i.e., from left to right—100% active, 75% active, 50% active, and 25% active). As the grayscale image decreases in intensity, the amount of material decreases by a smaller amount.

Figure 7B:
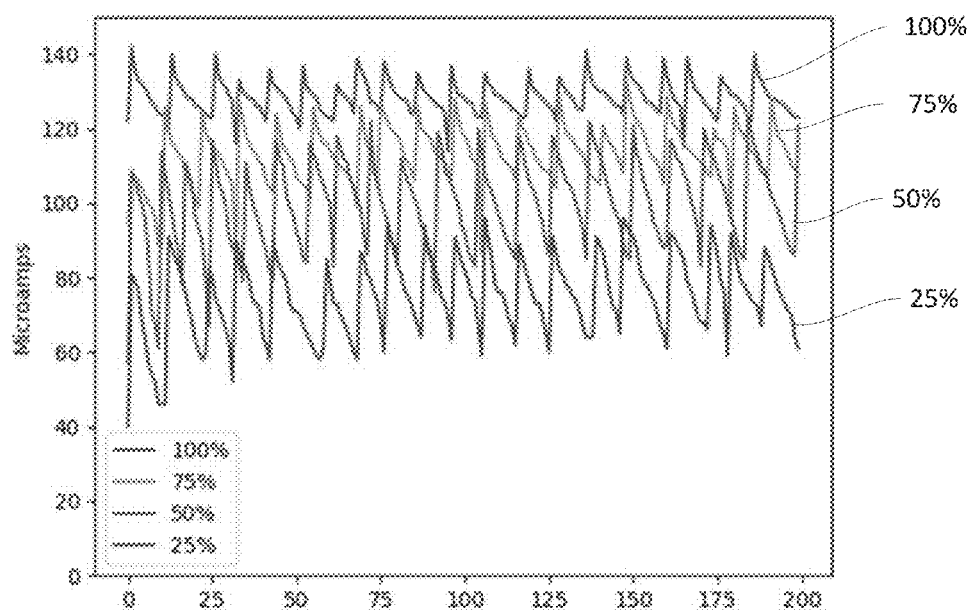
FIG. 7B is a plot of the current response as a function of time for four different ratios of activated individually-addressable electrodes (i.e., 100% active, 75% active, 50% active, and 25% active).

FIG. 7B is a plot of the current response as a function of time for four different ratios of activated individually-addressable electrodes (i.e., 100% active, 75% active, 50% active, and 25% active). The current response data suggests that this nonlinearity is not an effect of bubbles, but is likely a side effect of the underlying anode array. Specifically, the graph shows a plating run using the grayscaled image above and includes a debubbling step, in which the current can be seen sharply rising. The downward trend is from the accumulation of bubbles between the electrode surfaces. The stable peak values represent the current response when there are no bubbles present. The percentage of the peak values as compared to the global maximum matches the observed plating thickness fairly well.

Figure 7C:
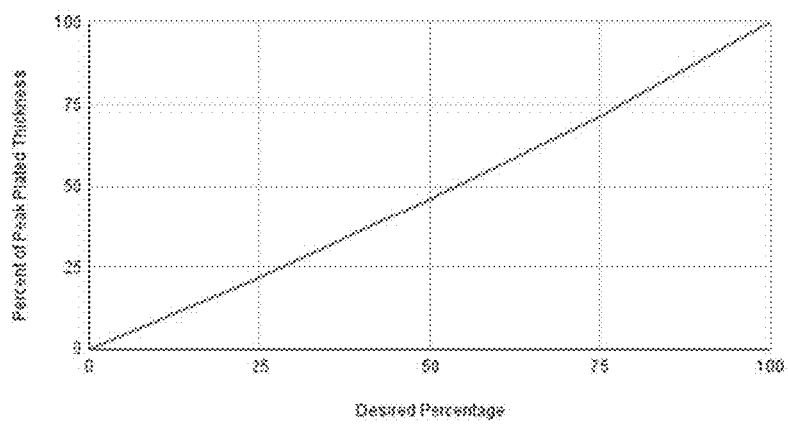
FIG. 7C is a plot of the actual plating thicknesses vs. desired plating thicknesses that were achieved by different ratios of activated individually-addressable electrodes.

FIG. 7C is a plot of the actual plating thicknesses vs. desired plating thicknesses that were achieved by different ratios of activated individually-addressable electrodes. By choosing a grayscale percentage from the observed plating thickness on the generated nonlinear curve, the system was able to achieve the desired plating thickness.

Conclusion

Although the foregoing concepts have been described in some detail for purposes of clarity of understanding, it will be apparent that certain changes and modifications may be practiced within the scope of the appended claims. It should be noted that there are many alternative ways of implementing processes, systems, and apparatuses. Accordingly, the present embodiments are to be considered illustrative and not restrictive.

The invention claimed is:

1. An electrochemical additive manufacturing system comprising:
   a deposition power supply;
   deposition control circuits, coupled to the deposition power supply;
   an electrode array, comprising individually-addressable electrodes such that each of the individually-addressable electrodes is electrically coupled to one of the deposition control circuits;
   a deposition electrode;
   an electrode-position actuator configured to
      (a) position the electrode array and the deposition electrode substantially parallel relative to each other in an initial relative position between the electrode array and the deposition electrode,
      (b) using at least a rotational translation, spatially translate the electrode array and the deposition electrode from the initial relative position between the electrode array and the deposition electrode to a shifted relative position between the electrode array and the deposition electrode; and
   a system controller configured to (a) create an initial target map, comprising individual target currents, based on the initial relative position between the electrode array and the deposition electrode, and (b) create an updated target map by shifting the individual target currents of the initial target map using a spatial reference between the initial relative position and the shifted relative position.

2. The electrochemical additive manufacturing system of claim 1, wherein each of the individual target currents corresponds to one of the individually-addressable electrodes, and wherein the deposition control circuits are configured to control electric current through each of the individually-addressable electrodes based on a corresponding one of the individual target currents in the initial target map and the updated target map.

3. The electrochemical additive manufacturing system of claim 1, wherein the spatial reference between the initial relative position and the shifted relative position corresponds to a number of the individually-addressable electrodes.

4. The electrochemical additive manufacturing system of claim 1, wherein the electrode-position actuator is configured to spatially translate the electrode array and the deposition electrode relative to each other using a linear translation from the initial relative position to the shifted relative position.

5. The electrochemical additive manufacturing system of claim 1, further comprising a sensor communicatively coupled to the system controller and configured to sense at least one:
   bubbling in an electrolyte solution provided between the electrode array and the deposition electrode, or
   composition variations in the electrolyte solution provided between the electrode array and the deposition electrode; and
   wherein the system controller is configured to instruct the electrode-position actuator to spatially translate the electrode array and the deposition electrode relative to each based on input from the sensor.

6. The electrochemical additive manufacturing system of claim 1, further comprising one or more position sensors communicatively coupled to the system controller, wherein the system controller is configured to create the updated target map based on input from the one or more position sensors.

7. The electrochemical additive manufacturing system of claim 6, wherein the individually-addressable electrodes are operable as the one or more position sensors.

8. The electrochemical additive manufacturing system of claim 7, wherein the input from the one or more position sensors comprises one or both of a voltage value and a current value, sensed at each of the individually-addressable electrodes.

9. The electrochemical additive manufacturing system of claim 1, wherein the system controller is further configured to create the updated target map based on desired variations in an additively deposited material in addition to the spatial reference between the initial relative position and the shifted relative position of the electrode array and the deposition electrode.

10. The electrochemical additive manufacturing system of claim 1, wherein each of the initial target map and the updated target map comprises instructions to simultaneously pass different levels of an electrical current through at least two of the individually-addressable electrodes.

11. The electrochemical additive manufacturing system of claim 10, wherein at least one of the different levels of the electrical current corresponds to no current passing.

12. The electrochemical additive manufacturing system of claim 11, wherein the system controller is further configured to determine a subset of the individually-addressable electrodes with no current passing using one of a Bayer matrix, a dispersed dot halftoning, a clustered-dot matrix, or a Jarvis error diffusion.

13. The electrochemical additive manufacturing system of claim 1, wherein the system controller is further configured to determine the individual target currents in the initial target map and the updated target map based on a charge density associated with each of the individually-addressable electrodes.

14. The electrochemical additive manufacturing system of claim 1, wherein the system controller is further configured to generate operating parameters for each of the individually-addressable electrodes based on a calibration map associated with at least one of an on-resistance of each of the individually-addressable electrodes or ohmic associated with each of the individually-addressable electrodes.

15. The electrochemical additive manufacturing system of claim 1, wherein the initial target map or the updated target map is generated based on at least one of:
   desired deposition rates,
   grain sizes with an additive deposited material,
   grain orientations within the additive deposited material,
   compositions of the additive deposited material,
   brightness values of the additive deposited material, or
   densities of the additive deposited material.

16. The electrochemical additive manufacturing system of claim 1, wherein the initial target map or the updated target map is generated based on one or more of:
   temperature of an electrolyte solution,
   conductivity of the electrolyte solution,
   flow rate of the electrolyte solution,
   composition of the electrolyte solution, or distance between an additive deposited material and the individually-addressable electrodes.

17. The electrochemical additive manufacturing system of claim 1, wherein the initial target map and the updated target map comprise duty cycles associated with each of the individual target currents.

18. The electrochemical additive manufacturing system of claim 17, wherein the duty cycles vary for different ones of the individual target currents.

19. The electrochemical additive manufacturing system of claim 1, wherein the electrode-position actuator is coupled to the deposition electrode.

20. The electrochemical additive manufacturing system of claim 1, wherein the deposition control circuits are formed by a thin-film transistor (TFT)-based array.

* * * * *